US008811955B2

(12) United States Patent
Lee (10) Patent No.: US 8,811,955 B2
(45) Date of Patent: Aug. 19, 2014

(54) PUSH-TO-ALL (PTA) SERVICE FACILITATING SELECTIVE DATA TRANSMISSION

(75) Inventor: Jin-Suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2087 days.

(21) Appl. No.: 11/581,392

(22) Filed: Oct. 17, 2006

(65) Prior Publication Data

US 2007/0195861 A1 Aug. 23, 2007

(30) Foreign Application Priority Data

Feb. 17, 2006 (KR) .................. 10-2006-0015866

(51) Int. Cl.
*H04M 3/42* (2006.01)
(52) U.S. Cl.
USPC ......... 455/414.1; 455/416; 455/518; 455/519
(58) Field of Classification Search
USPC ...................................................... 455/414.1
See application file for complete search history.

(56) References Cited

U.S. PATENT DOCUMENTS

| 2002/0039895 | A1* | 4/2002 | Ross et al. ............. | 455/414 |
| 2003/0182374 | A1* | 9/2003 | Haldar .................. | 709/205 |
| 2004/0028199 | A1 | 2/2004 | Carlson | |
| 2006/0094455 | A1* | 5/2006 | Hannu et al. ............ | 455/518 |

FOREIGN PATENT DOCUMENTS

| WO | WO 00/47005 | 8/2000 |
| WO | WO 03/036927 | 5/2003 |
| WO | 2005086521 | 9/2005 |

OTHER PUBLICATIONS

OMA-TS_PoC-UserPlane-V2_0-20051110-D Draft Version 2.0—Nov. 10, 2005.*
European Search Report issued on Jun. 28, 2007, corresponding to European Patent Application No. 06023116.4.
Schulzrinne, et. al. Columbia University. "*RTP: A Transport Protocol for Real-Time Applications.*" Standards Track. Jul. 2003.
"*Push to Talk over Cellular (PoC) V2.0 Architecture.*" Open Mobile Alliance. Http://member.openmobilealliance.org/ftp/public_documents/POC/Permanent_documents/OMA-AD-PoC-V2_0-20060214-D.zip>. Feb. 14, 2006.
Office Action from Chinese Patent Office issued in Applicant's corresponding Chinese Patent Application No. 2006101435491 dated Apr. 3, 2009 and Request for Entry of the Accompanying Office Action.
English Translation of Office Action from Chinese Patent Office issued in Applicant's corresponding Chinese Patent Application No. 2006101435491 dated Apr. 3, 2009.

* cited by examiner

*Primary Examiner* — Wayne Cai
(74) *Attorney, Agent, or Firm* — H.C. Park & Associates, PLC (57) ABSTRACT

In a Push-To-All (PTA) service system and method enabling selective designation of data transmission targets, a transmitting PTA terminal requests a selective data transmission to a PTA server using a receiver-designated Talk Burst Control Protocol (TBCP) message containing information about some receiving PTA terminals participating in the same session as the transmitting PTA terminal, and the PTA server transmits data received from the transmitting PTA terminal to designated receiving PTA terminals by referring to the information contained in the receiver-designated TBCP message. Thus, a selective data transmission can be performed within one PTA session.

20 Claims, 8 Drawing Sheets

| | 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V=2 | P | 0 | 0 | 0 | 1 | 0 | | | | PT=AP=204 | | | | | | | | | Length=4 | | | | | | | | | | | | |
| SSRC of PTA server |||||||||||||||||||||||||||||||||
| Name = PoC1 |||||||||||||||||||||||||||||||||
| F | user1@ims.com ||||||||||||||||||||||||||||||||
| F | user9@ims.com ||||||||||||||||||||||||||||||||

FIG. 4

| 0 | 1 | 2 | 3 |
|---|---|---|---|
| 0 1 2 3 4 5 6 7 8 9 0 1 2 3 4 5 6 7 8 9 0 1 2 3 4 5 6 7 8 9 0 1 | | | |
| V=2 | P | 0 0 0 1 0 | PT=AP=204 | Length=4 |
| SSRC of PTA server ||||
| Name = PoC1 ||||

|  | 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V=2 | P | 0 | 0 | 0 | 1 | 0 | | | | PT=AP=204 | | | | | | | | | Length=4 | | | | | | | | | | | | |
| SSRC of PTA server ||||||||||||||||||||||||||||||||| 
| Name = PoC1 |||||||||||||||||||||||||||||||||
| T | user1@ims.com |||||||||||||||||||||||||||||||
| T | user9@ims.com |||||||||||||||||||||||||||||||

FIG. 7

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V=2 | P | 0 | 0 | 0 | 1 | 0 | PT=AP=204 | Length=4 |
| SSRC of PTA server |
| Name = PoC1 |
| sequence number of last packet | padding |
| F | user1@ims.com |
| F | user9@ims.com |

FIG. 8

PUSH-TO-ALL (PTA) SERVICE FACILITATING SELECTIVE DATA TRANSMISSION

CLAIM OF PRIORITY

This application makes reference to, incorporates the same herein, and claims all benefits accruing under 35 U.S.C. §119 from an application for SYSTEM AND METHOD FOR SERVING THE PTA SER VICE FOR SELECTIVE DATA TRANSMISSION earlier filed in the Korean Intellectual Property Office on the 17 Feb. 2006 and there duly assigned Serial No. 10-2006-0015866.

BACKGROUND OF THE INVENTION

1. Field of the Invention

The present invention relates to a Push-To-All (PTA) service system and method facilitating selective data transmission, in which a PTA service user having the floor in a PTA session can select data to be transmitted.

2. Description of the Related Art

A Push-To-All (PTA) service is an Internet Protocol (IP) Multimedia Subsystem (IPMS)-based service, and includes a Push-To-Talk (PTT) service, a Push-To-Video (PTV) service, a Message Session Relay Protocol (MSRP) service, and so on. The PTT service is for transmitting voice data, the PTV service is for transmitting image data, and the MSRP service is for transmitting text messages or binary data.

A PTA terminal intending to get the PTA service first establishes a PTA session with a correspondent PTA terminal, and then can request or release the floor (right to speak) using a Floor Control Protocol (FCP). When granted the floor, the PTA terminal can speak or transmit data. When another PTA terminal is granted the floor, the PTA terminal can hear speech from the other PTA terminal or receive data from the other PTA terminal.

It is a unique feature of the PTA service to support a group service that allows at least three users to participate in one session and simultaneously hear the same conversation or receive the same data. In other words, the PTA service allows one person to have a video conversation with or transmit data to more than one other person at the same time.

There are cases in which a person having the floor would like to transmit to only some session participants or not transmit to certain participants. However, the conventional PTA service cannot accommodate such selective transmission because it is designed so that information, such as voice, image, or data, transmitted by the person having the floor is delivered to all participants in the session.

SUMMARY OF THE INVENTION

It is, therefore, an object of the present invention to provide a Push-To-All (PTA) service system and method facilitating selective data transmission, capable of transmitting data to only some session participants.

It is another object of the present invention to provide a PTA service system and method facilitating selective data transmission, capable of transmitting data transmitted by a transmitting PTA terminal having the floor in a PTA session to only some receiving PTA terminals in the PTA session, or to all excluding some receiving PTA terminals in the PTA session.

It is still another object of the present invention to provide a PTA service system and method facilitating selective data transmission, in which, while all participants have already participated in a PTA session for the purpose of a PTA service, a transmitting PTA terminal having the floor can transmit data to only specified participants or to all excluding the specified participants.

According to one aspect of the present invention, a Push-To-All (PTA) service system facilitating a selective data transmission is provided, the PTA service system including: a transmitting PTA terminal adapted to request transmission of data to certain designated receiving PTA terminals among all receiving PTA terminals participating in a session in which the transmitting PTA terminal participates; and a PTA server adapted to transmit data received from the transmitting PTA terminal to the designated receiving PTA terminals in response to the request of the transmitting PTA terminal.

The transmitting PTA terminal is preferably adapted to transmit a receiver-designated Talk Burst Control Protocol (TBCP) message containing information as to the designated receiving PTA terminals to the PTA server before data is transmitted, in order to transmit data to the designated receiving PTA terminals.

The receiver-designated TBCP message preferably includes information as to the designated receiving PTA terminals, and information indicating whether the designated receiving PTA terminals are included or excluded from the PTA terminals to receive the data. The TBCP message preferably includes Uniform Resource Identifier (URI) information of the designated receiving PTA terminals, and either T flags or F flags corresponding to each of the designated receiving PTA terminals.

The transmitting PTA terminal is preferably adapted to transmit data that is to be transmitted to the designated receiving PTA terminals after receiving an acceptance response to the receiver-designated TBCP message from the PTA server.

The PTA server is preferably adapted to transmit data received from the transmitting PTA terminal to be transmitted to the designated receiving PTA terminals to the receiving PTA terminals designated by the receiver-designated TBCP message. The PTA server is preferably adapted to determine whether or not the transmitting PTA terminal is capable of designating a data transmission target, and to transmit an acceptance response to the request to the transmitting PTA terminal upon a determination that the transmitting PTA terminal is capable of designating a data transmission target.

The transmitting PTA terminal is preferably adapted to request termination of a selective data transmission by transmitting a TBCP_RELEASE message to the PTA server.

The PTA server is preferably adapted to terminate a selective data transmission by the transmitting PTA terminal when the transmitting PTA terminal loses the floor. The PTA server is preferably adapted to inform the receiving PTA terminals designated by the transmitting PTA terminal that the designated receiving PTA terminals have been designated as targets of a selective data transmission, using a TBCP_TAKEN message.

The transmitting PTA terminal preferably includes a PTA terminal currently having the floor.

The data preferably includes at least one of Push-To-Talk (PTT) data, Push-To-Video (PTV) data, and Message Session Relay Protocol (MSRP) data.

According to another aspect of the present invention, a Push-To-All (PTA) service method facilitating a selective data transmission is provided, the PTA service method including: a transmitting PTA terminal designating some receiving PTA terminals participating in a session in which the transmitting PTA terminal participates as targets of a subsequent data transmission by the transmitting PTA terminal, for the purpose of a selective data transmission; the transmitting PTA terminal transmitting data to be transmitted to the designated receiving PTA terminals participating in the session in which the transmitting PTA terminal participates; a PTA server receiving the data from the transmitting PTA terminal; and the PTA server transmitting the data to the designated receiving PTA terminals.

Designating some receiving PTA terminals preferably includes the transmitting PTA terminal transmitting a receiver-designated Talk Burst Control Protocol (TBCP) message containing information as to the designated receiving PTA terminals to the PTA server. Designating some receiving PTA terminals preferably further includes the transmitting PTA terminal receiving an acceptance response to the receiver-designated TBCP message from the PTA server.

The PTA service method preferably further includes the PTA server storing information of the receiving PTA terminals which is contained in the receiver-designated TBCP message.

The PTA service method preferably further includes the transmitting PTA terminal requesting termination of a selective data transmission.

Requesting termination of selective data transmission preferably includes the transmitting PTA terminal transmitting a TBCP_RELEASE message containing identification information of the designated receiving PTA terminals to the PTA server.

The PTA service method preferably further includes the PTA server terminating selective data transmission by the transmitting PTA terminal upon the transmitting PTA terminal losing the floor.

The PTA service method preferably further includes the PTA server informing the receiving PTA terminals designated by the transmitting PTA terminal that the designated receiving PTA terminals have been designated as targets of a selective data transmission.

As described above, the PTA service system and method facilitating selective data transmission according to the present invention is characterized by designating the PTA terminals to which the data is to be transmitted using the TBCP message, and transmitting the data to only the designated PTA terminals.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, the present invention is described in more detail with reference to the accompanying drawings, in which exemplary embodiments of the present invention are shown. In the drawings, like reference numbers and symbols refer to like elements throughout the specification. To enable a clear understanding of the present invention, related technology that is well known to those of ordinary skill in the art to which the present invention pertains, have not been described in detail.

Figure 1:
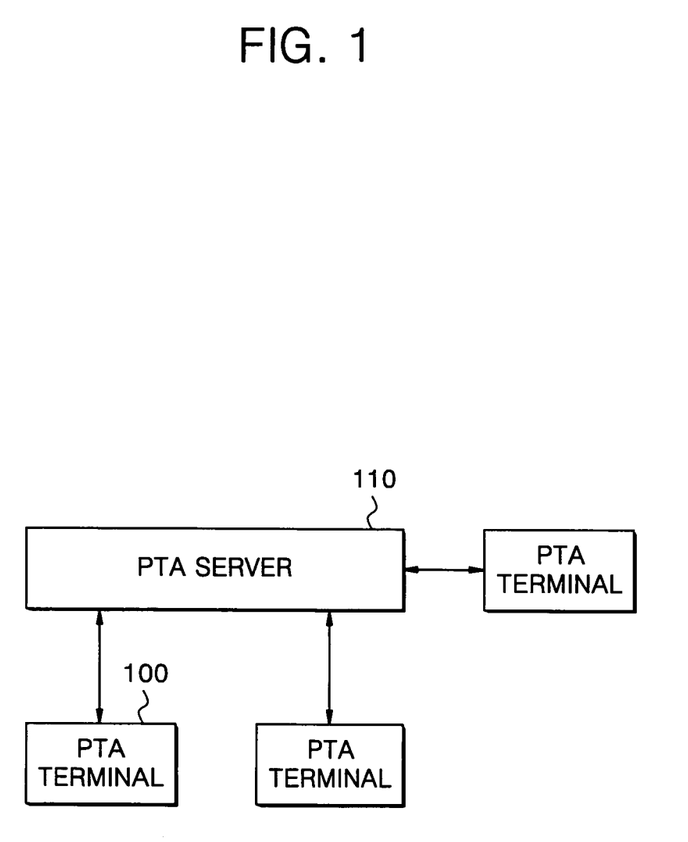
FIG. 1 is a block diagram of a Push-To-All (PTA) system, in which a plurality of PTA terminals are connected to a PTA server.

FIG. 1 is a block diagram of a configuration of an ordinary Push-To-All (PTA) system, in which a plurality of PTA terminals are connected to a PTA server.

As illustrated in FIG. 1, the PTA system includes at least one PTA terminal 100 and a PTA server 110.

The PTA terminal 100 is used by a PTA service user to receive a PTA service, and has a PTA client, which is a PTA service requester, contained therein. All requests of the PTA service user are transmitted to the PTA system including the PTA server 110 through the PTA terminal 100, and responses are transmitted to the PTA service user through the PTA terminal 100. Hence, the PTA service user will not be separately described below. As long as no strict distinction is required, the term "PTA terminal 100" is used to refer both to the terminal itself and the PTA service user.

The PTA terminal 100 makes it possible to access a PTA service. The PTA terminal 100 serves to create a new PTA session, participate in an existing PTA session that has already been created, and terminate a created PTA session. In addition, the PTA terminal 100 can serve to create and deliver a talk burst, perform authentication when providing access to the PTA 8 service, and so on.

The PTA server 110 can maintain and manage the PTA session. For example, the PTA server 110 can manage the floor in each session. When requested the floor by any PTA terminal 100, the PTA server 110 determines whether or not to yield the floor to the corresponding PTA terminal 100. According to the result of the determination, the PTA server 110 can yield the floor to the corresponding PTA terminal 100, or reject the request for the floor of the corresponding PTA terminal 100. Furthermore, the PTA server 110 can control data transmission between the PTA terminals 100 participating in the session. In other words, the PTA server 110 can transmit the talk burst received from the PTA terminal 100 having the floor to the other PTA terminals 100 participating in the session.

As illustrated in FIG. 1, the PTA system can have a server-client structure formed by the PTA terminal 100 and the PTA server. FIG. 1 illustrates a PTA system in which the plurality of PTA terminals 100 are connected to one PTA server 110. However, such a configuration is merely an example to aid in understanding the present invention. The structure of the PTA system to which the present invention can be applied is not limited to this configuration. The present invention can be also applied to a PTA system in which different PTA servers 110 are interconnected via a network, for example, and PTA terminals 100 connected to different PTA servers 110, etc.

In the PTA system, signaling can be carried out through a Session Initiation Protocol (SIP), a signaling protocol. For example, a PTA session can be set up by using an SIP_IN-VITE method. SIP is a text-based application level protocol, which operates on a server-client model. Due to its simple structure and excellent expandability compared to existing protocols, SIP is used in various fields such as Internet telephony, video telephony, multimedia, on-line game connection, etc.

After the PTA session is set up, data transmission in the PTA system is controlled by a Talk Burst Control Protocol (TBCP) message. The TBCP message can be used for transmission control of various data including media data such as image, voice, etc. The TBCP message can be implemented on the basis of a Real-time Transport Protocol (RTP) Real-time Transport Control Protocol (RTCP) Application packet (RTCP:APP), which is defined in RFC 3550.

In the present invention, the PTA terminal 100 can designate a data transmission target. This transmission target can be designated using the TBCP message.

The PTA terminal 100 transmits the TBCP message designating transmission targets from among the other PTA terminals 100 participating in the same session, i.e., including identification information of other PTA terminals 100 to which data will be transmitted, to the PTA server 100 that controls maintenance, management, data transmission, etc. of the session. In particular, a TBCP_REQUEST message is used to transmit a request of each PTA terminal 100 to the PTA server 110.

To exclude some of the other PTA terminals 100 participating in the session from the data transmission targets, the PTA terminal 100 includes an F flag (short for "false flag") and Canonical NAME (CNAME) information of the PTA terminal 100 in the TBCP_REQUEST message, and then transmits the TBCP_REQUEST message to the PTA server 110. An example of the CNAME information includes information on a Uniform Resource Identifier (URI). Another example of the CNAME information includes a telephone number. In contrast, to include only some of the other PTA terminals 100 participating in the session in the data transmission targets, the PTA terminal 100 transmits a TBCP_RE-QUEST message including a T flag (short for "true flag") and Canonical NAME (CNAME) information of the PTA terminal 100 to the PTA server 10.

In response to the request of the PTA terminal 100, the PTA server 110 transmits the data transmitted by the PTA terminal 100 only to other PTA terminals 100 designated by the PTA terminal 100. When a request for selective data transmission, i.e., a request to transmit data to only some of the other PTA terminals 100 participating in the session, is received from an arbitrary PTA terminal 100, the PTA server 110 transmits data received from the arbitrary PTA terminal 100 later to the PTA terminals 100 designated by the arbitrary PTA terminal 100.

The PTA server 110 determines whether or not to grant the request of the PTA terminal 100 for the selective data transmission based on systems settings. In other words, when receiving the request for selective data transmission for the arbitrary PTA terminal, the PTA server 110 can grant or reject the request of the PTA terminal 100 based on a setting of whether or not the PTA terminal 100 is capable of receiving a selective data transmission service. The PTA server 110 stores the setting information for determining whether or not to grant the selective data transmission service to the PTA terminal 100, information of selected PTA terminals 100 which is for providing the selective data transmission service to the PTA terminal 100 to which the selective data transmission service is granted, etc.

The PTA server 110 informs the PTA terminal 100 as to whether or not the request shall be granted using a TBCP_GRANT message. In the case of granting the request, the PTA server 110 transmits the TBCP_GRANT message to the PTA terminal 100. To indicate grant or rejection of the request, the PTA server 110 transmits the TBCP_GRANT message containing information indicating grant or rejection of the request to the PTA terminal 100.

Upon receipt of the TBCP_GRANT message granting selective data transmission from the PTA server 110, the PTA terminal 100 determines that its request has been granted. Thereafter, the data transmitted by the PTA terminal 100 is transmitted only to other PTA terminals designated by the PTA terminal 100.

Then, to terminate the selective data transmission, the PTA terminal 100 transmits a TBCP_RELEASE message notifying the PTA server 110 of the intent to terminate. The TBCP_RELEASE message includes a flag opposite to the TBCP_REQUEST message requesting the selective data transmission. More specifically, when the TBCP_REQUEST message contains the T flag and the CNAME information of the PTA terminals 100, the TBCP_RELEASE message requesting termination of selective data transmission contains the F flag and the CNAME information of the PTA terminals 100. In contrast, when the TBCP_REQUEST message contains the F flag and the CNAME information of the PTA terminals 100, the TBCP_RELEASE message requesting termination of selective data transmission contains the T flag and the CNAME information of the PTA terminals 100.

The PTA terminal 100, also receives information as to whether or not to grant the TBCP_RELEASE message from the PTA server 110 through the TBCP_GRANT message.

The floor can be taken or transmission of data by the PTA terminal 100 having the floor can be forcibly terminated by the PTA server 110 before the PTA terminal 100 voluntarily yields the floor or terminates data transmission due to setting of a floor time limit of the corresponding PTA system. In this way, considering that the floor is forcibly taken from the PTA terminal 100, even when the PTA terminal 100 requesting the selective data transmission does not transmit the TBCP_RE-LEASE message, the selective data transmission of the PTA terminal 100 can be set to be terminated when the floor is taken or data transmission of the PTA terminal 100 is terminated. This setting can be dependent on basic settings of the PTA system or can be performed by the PTA terminals 100 and stored by the PTA server 110.

Furthermore, the request of the PTA terminal 100 for selective data transmission is maintained until the PTA terminal 100 transmits the TBCP_RELEASE message. Maintaining the request for selective data transmission means that when the PTA terminal 100 from whom the floor is taken and data transmission is forcibly terminated by the PTA server 110 during the selective data transmission obtains the floor again, the floor or data of the PTA terminal 100 is transmitted to only the PTA terminals 100 designated by the previous PTA terminal 100.

The other PTA terminals 100 designated as targets of a selective data transmission by the arbitrary PTA terminal 100 need to recognize that they are the targets of the selective data transmission. The reason is as follows: when the other PTA terminals 100 do not know that the data which they have received has been transmitted selectively, any PTA terminal 100 receiving the data transmits a response to reception of the data to all of the PTA terminals 100 participating in the session, thereby giving a sense of estrangement to the PTA terminals 100 not designated as targets of the selective data transmission. The PTA server 110 uses a TBCP_TAKEN message to inform the PTA terminal 100 that it is designated as a target of the selective data transmission. The TBCP_TAKEN message is used to inform the other PTA terminals 100 participating in the same session as a specified PTA terminal 100 that the floor has been granted to the specified PTA terminal 100.

Figure 2:
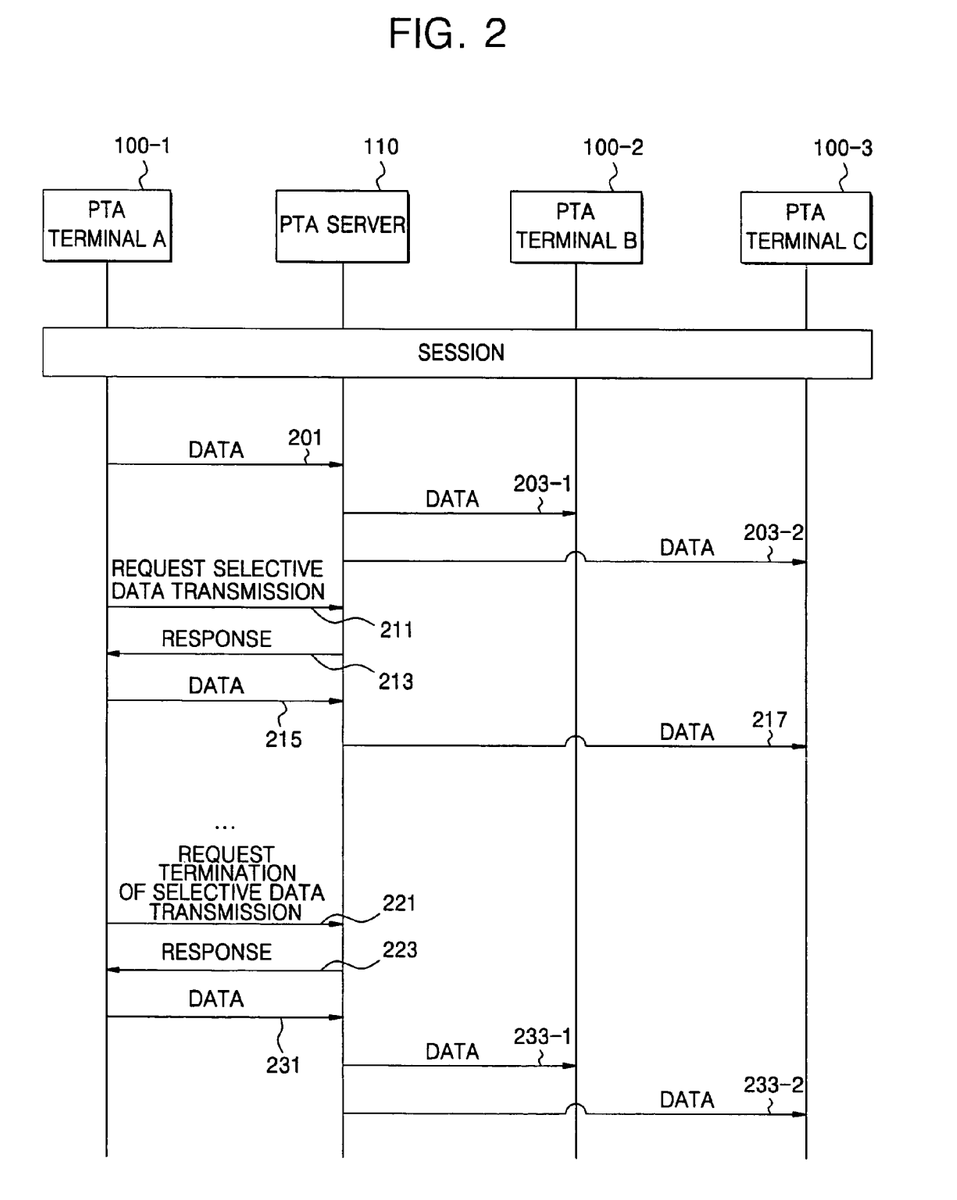
FIG. 2 is a view of a flow of signals between PTA terminals and a PTA server, according to an exemplary embodiment of the present invention.

FIG. 2 is a view of a flow of signals between PTA terminals and a PTA server, according to an exemplary embodiment of the present invention.

In FIG. 2, three PTA terminals, i.e., a PTA terminal A 100-1, a PTA terminal B 100-2, and a PTA terminal C 100-3, and a PTA server 110, are illustrated. It is assumed that the PTA terminal A 100-1, which can be any one of the three PTA terminals 100-1, 100-2 and 100-3, has the floor. Furthermore, the PTA terminal A 100-1 currently having the floor is referred to as a transmitting PTA terminal. The other terminals, i.e., the PTA terminal B 100-2 and the PTA terminal C 100-3, are referred to as receiving PTA terminals.

The PTA terminal A 100-1, the PTA terminal B 100-2, and the PTA terminal C 100-3 participate in the same session to receive PTA service. Of course, there can be more than three PTA terminals capable of participating in one session. However, to simplify the following description, the case of three PTA terminals participating in one session will be taken as an example but should not be construed as limiting the present invention.

The PTA terminal A 100-1, the PTA terminal B 100-2, and the PTA terminal C 100-3 of FIG. 2 participate in one session together, and data transmission between these PTA terminals 100-1, 100-2 and 100-3 is controlled by the PTA server 110.

Data transmitted by the transmitting PTA terminal, PTA terminal A 100-1, having the floor, is transmitted to the PTA server 110 first (S201). The data can be transmitted to the receiving PTA terminals, i.e., the PTA terminal B 100-2 and the PTA terminal C 100-3, via the PTA server 110 (S203-1 and S203-2).

The PTA terminal A 100-1 can request the PTA server 110 to transmit the data the PTA terminal A 100-1 transmits to only the PTA terminal C 100-3, i.e., can make a request to the PTA server 110 for a selective data transmission (S211). This request is transmitted to the PTA server 110 by a receiver-designated TBCP message, i.e., a TBCP_REQUEST message containing identification information of the receiving PTA terminals that are targets for the subsequent transmission of data by the PTA terminal A 100-1. Of course, the TBCP_REQUEST message can contain identification information of the receiving PTA terminals that are excluded from the targets of subsequent data transmission by the PTA terminal A 100-1. Among the TBCP_REQUEST messages, the former can contain a T flag and the identification information of the receiving PTA terminals that are data transmission targets, and the latter can contain an F flag and the identification information of the receiving PTA terminals that are excluded from the data transmission targets.

In general, as the identification information of each PTA terminal, URI information of each PTA terminal 100 can be used. In order to transmit data to only the PTA terminal C 100-3, the PTA terminal A 100-1 can transmit the TBCP_REQUEST message containing a T flag and CNAME information of the PTA terminal C 100-3, or the TBCP_REQUEST message containing an F flag and CNAME information of the PTA terminal B 100-2, to the PTA server 110.

The PTA terminal A 100-1 can receive a response to the receiver-designated TBCP message from the PTA server 110 (S213). The response received from the PTA server 110 is made by a TBCP_GRANT message.

Thereafter, when the PTA terminal A 100-1 transmits data (S215), the PTA server 110 transmits the data to only the PTA terminal C 100-3 selected as a transmission target by the PTA terminal A 100-1 (S217). The PTA server 110 transmits the data from the PTA terminal A 100-1 to only the PTA terminal C 100-3 until termination of the selective data transmission is requested by the PTA terminal A 100-1.

To terminate the selective data transmission, the PTA terminal A 100-1 transmits a TBCP_RELEASE message for requesting termination of the selective data transmission to the PTA server 110 (S221). The PTA server 110 transmits the TBCP_GRANT message to the PTA terminal A 100-1 in response to the TBCP_RELEASE message of the PTA terminal A 100-1 (S223).

Then, when the PTA terminal A 100-1 transmits the data (S231), the data is transmitted to both the PTA terminal B 100-2 and the PTA terminal C 100-3 (S233-1 and S233-2).

The TBCP message that can be used for the present invention is described below with reference to the accompanying drawings. A format of each TBCP message suggested below is based on the RTCP:APP, which is defined in RFC 3550.

Figure 3:
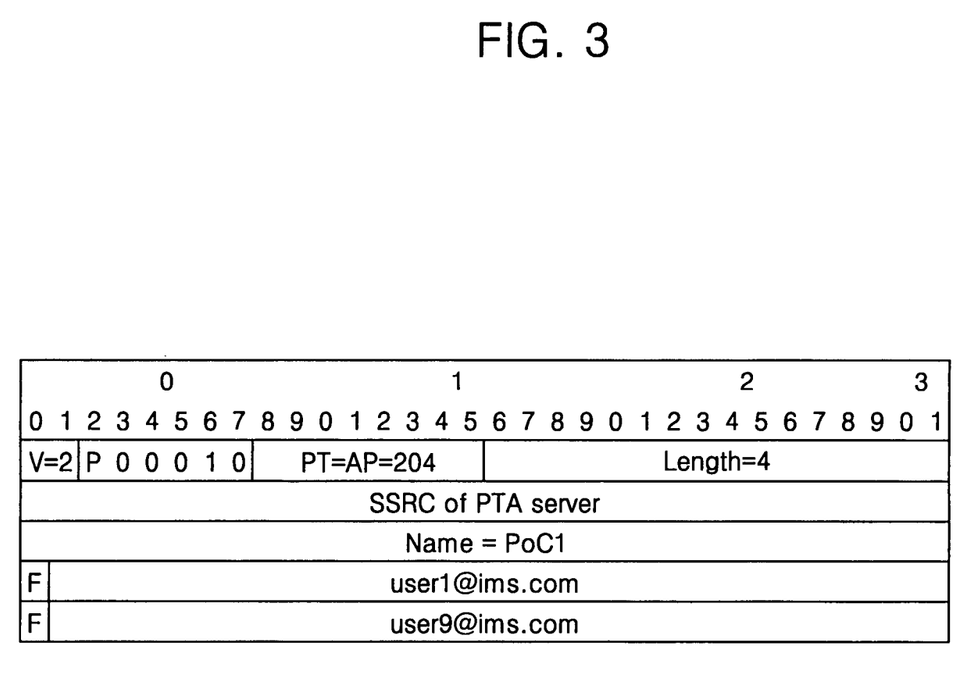
FIG. 3 is a view of a format of a Talk Burst Control Protocol (TBCP)_REQUEST message used by a transmitting PTA terminal to request exclusion of some receiving PTA terminals participating in the same session as the transmitting PTA terminal as targets of subsequent data transmission by the transmitting PTA terminal, according to an exemplary embodiment of the present invention.
Figure 4:
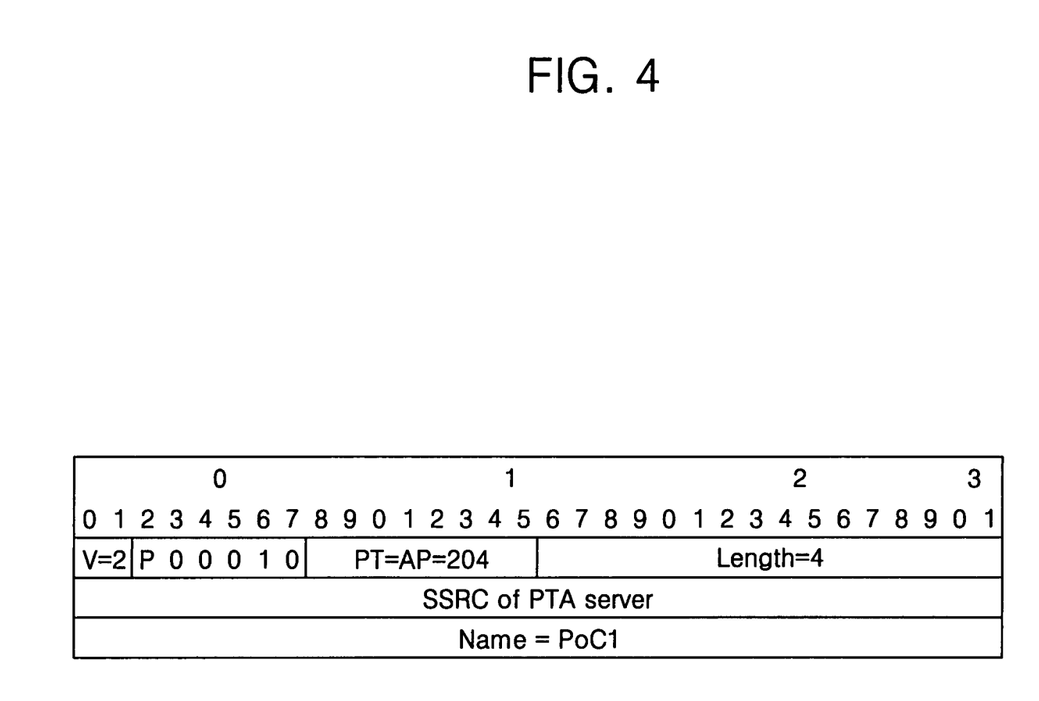
FIG. 4 is a view of a format of a TBCP_TAKEN message corresponding to a TBCP_REQUEST message.
Figure 5:
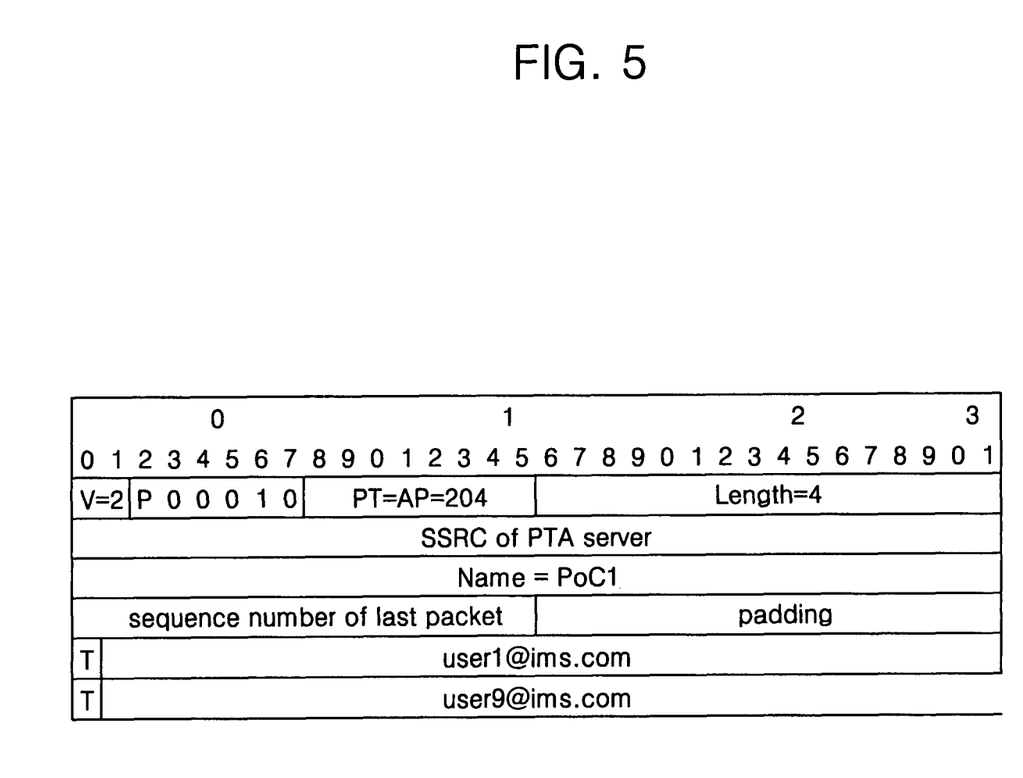
FIG. 5 is a view of a format of a TBCP_RELEASE message used to terminate selective data transmission requested by the TBCP_REQUEST message of FIG. 3.

FIGS. 3, 4 and 5 are views of TBCP messages used for selective data transmission in which some receiving PTA terminals participating in a session are excluded from transmission targets of data transmitted by a transmitting PTA terminal, according to an exemplary embodiment of the present invention.

FIG. 3 is a view of a format of a TBCP_REQUEST message used by a transmitting PTA terminal to request exclusion of some receiving PTA terminals participating in the same session as the transmitting PTA terminal as targets of a subsequent data transmission by the transmitting PTA terminal.

The TBCP_REQUEST message can contain a 2-bit Version field, a 1-bit Padding field, a 5-bit Subtype field, a 1-byte Payload Type (PT) field, a 2-byte Length field, a 4-byte SSRC (Synchronization SouRCe) field, a Name field, and an Application-Dependent Data field.

The Version field includes RTP version information of the TBCP message. The TBCP message of FIG. 3 is a message of RTP version 2. The Padding field includes information as to whether or not a padding octet that does not belong to a payload has been added. The Subtype field contains information as to what role of TBCP the TBCP message plays. The Payload Type field contains information as to the purpose for which the TBCP message is being used. For example, "204" in FIG. 3 indicates that the TBCP message is used for control. The Length field contains information as to the length of the TBCP message.

The SSRC field contains information for synchronization of data. The Name field includes information about a system in which the TBCP message is used. In the Name field of FIG. 3, "PoC1" means that the TBCP message can be used in a system for Open Mobile Alliance (OMA) PTT over Cellular (PoC) version 1. Generally, the Name field can be expressed by an American Standard Code for Information Interchange (ASCII) value.

The following TBCP messages of FIGS. 4 through 8, also, contain the above-described fields. Thus, these fields will not be separately described below.

The Application-Dependent Data field can contain an F flag and URI information of the PTA terminals. More specifically, the PTA terminals indicated in the Application-Dependent Data field of the TBCP_REQUEST message of FIG. 3 are the receiving PTA terminals, each of which is excluded from the transmission targets of the data transmitted by the transmitting PTA terminal. The Application-Dependent Data field can include information about at least one PTA terminal. The transmitting PTA terminal can request selective data transmission according to the present invention by transmitting the TBCP_REQUEST message of FIG. 3 to the PTA server.

FIG. 4 is a view of a format of a TBCP_GRANT message, which corresponds to a TBCP_REQUEST message.

The TBCP_GRANT message is used to acknowledge that the request based on the TBCP_REQUEST message has been accepted. The TBCP_GRANT message can be transmitted from the PTA server to the transmitting PTA terminal. The TBCP_GRANT message of the present invention can further include a field having the same content as the Application-Dependent Data field.

FIG. 5 is a view of a format of a TBCP_RELEASE message used to terminate the selective data transmission requested by the TBCP_REQUEST message of FIG. 3.

The TBCP_RELEASE message contains a "sequence number of last packet" field for indicating whether or not it corresponds to any one of various data transmitted through a session. The "sequence number of last packet" field can include a sequence number of a last packet of data corresponding to the TBCP_RELEASE message.

The transmitting PTA terminal can use the TBCP_RELEASE message of in FIG. 5 to terminate the selective data transmission according to the present invention, that is, to terminate the transmission of data to only some of the receiving PTA terminals in the session. The TBCP_RELEASE message of FIG. 5 corresponds to the TBCP_REQUEST message of FIG. 3 which contains the F flag and a T flag. The TBCP_RELEASE message of FIG. 5 can be transmitted from the PTA terminal to the PTA server.

Figure 6:
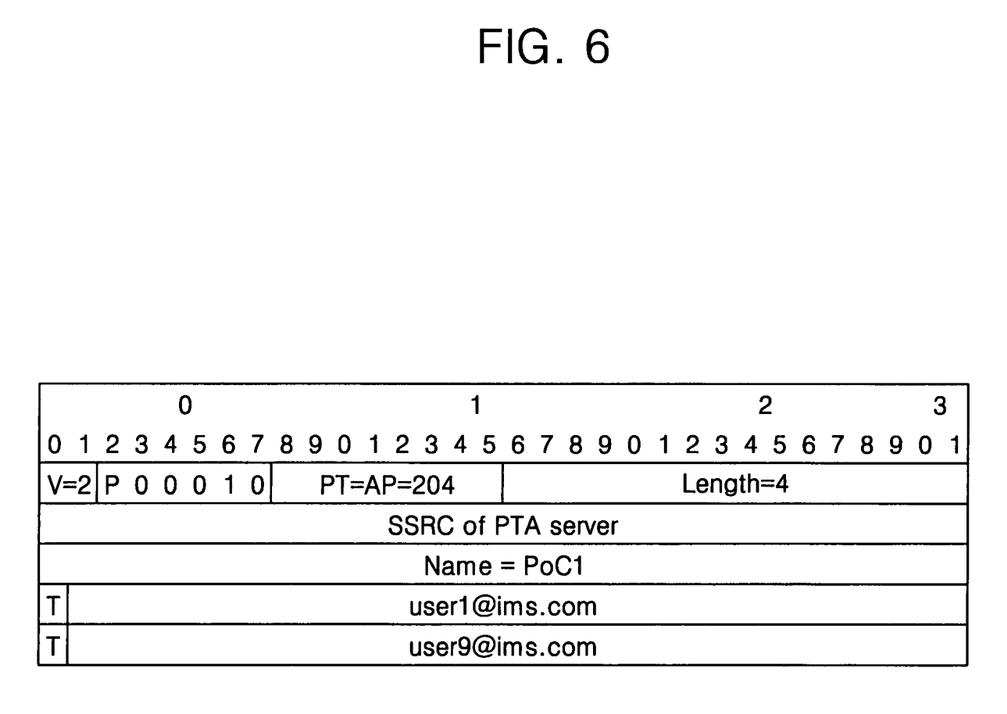
FIG. 6 is a view of a format of a TBCP_REQUEST message used by a transmitting PTA terminal to request inclusion of some receiving PTA terminals participating in the same session as the transmitting PTA terminal as targets of subsequent data transmission by the transmitting PTA terminal, according to another exemplary embodiment of the present invention.
Figure 7:
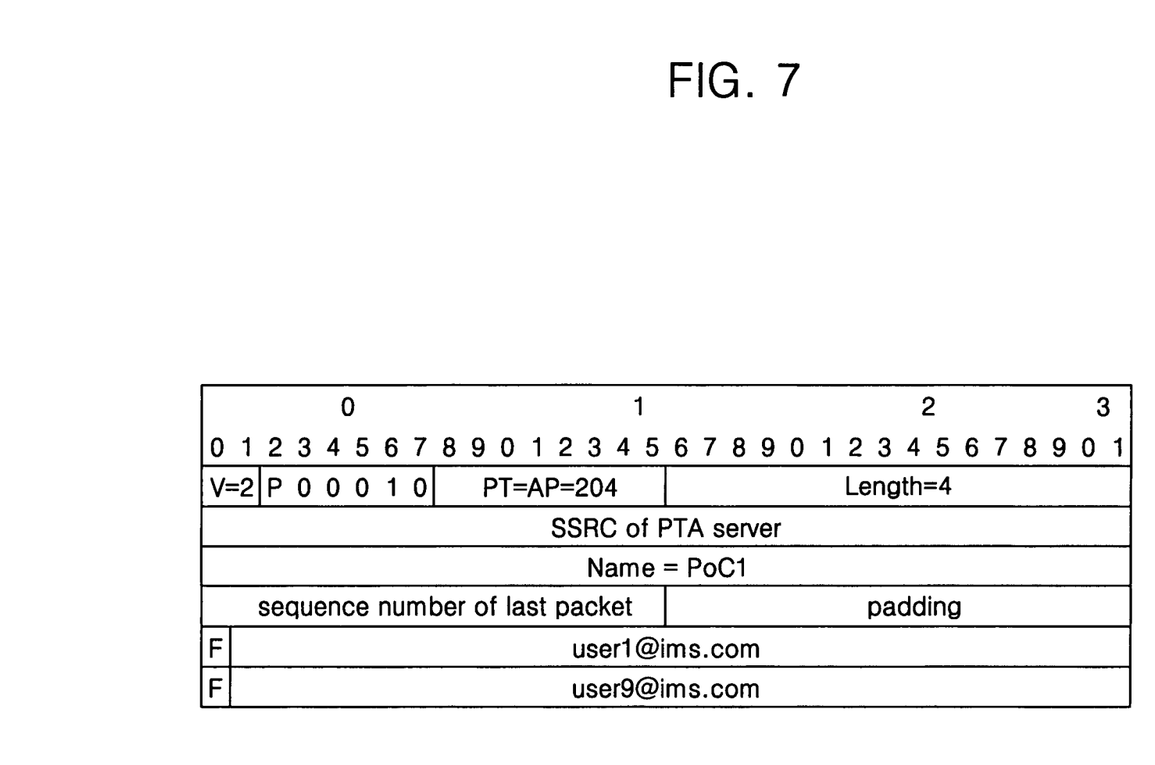
FIG. 7 is a view of a format of a TBCP_RELEASE message used to terminate selective data transmission requested by the TBCP_REQUEST message of FIG. 6.

FIGS. 6 and 7 are views of TBCP messages used for selective data transmission in which some receiving PTA terminals participating in a session are included as transmission targets of data transmitted by a transmitting PTA terminal. In this respect, FIGS. 6 and 7 illustrate embodiments different from those of FIGS. 3 and 5.

FIG. 6 is a view of a format of a TBCP_REQUEST message used by a transmitting PTA terminal to request inclusion of some receiving PTA terminals participating in the same session as the transmitting PTA terminal as targets of a subsequent data transmission by the transmitting PTA terminal.

An Application-Dependent Data field of the TBCP_REQUEST message of FIG. 6 contains a T flag and URI information of the PTA terminals. The PTA terminals indicated in the Application-Dependent Data field of the TBCP_REQUEST message of FIG. 6 are the receiving PTA terminals included as transmission targets of the data transmitted by the transmitting PTA terminal.

FIG. 7 is a view of a format of a TBCP_RELEASE message used to terminate the selective data transmission requested by the TBCP_REQUEST message of FIG. 6.

The TBCP_RELEASE message of FIG. 7 is used to terminate a request based on the TBCP_REQUEST message of FIG. 6. The TBCP_RELEASE message of FIG. 8 corresponds to the TBCP_REQUEST message of FIG. 6 containing the T flag, and contains an F flag.

Processes of a PTA service method for a selective data transmission according to the present invention are described below with reference to the accompanying drawings.

Figure 8:
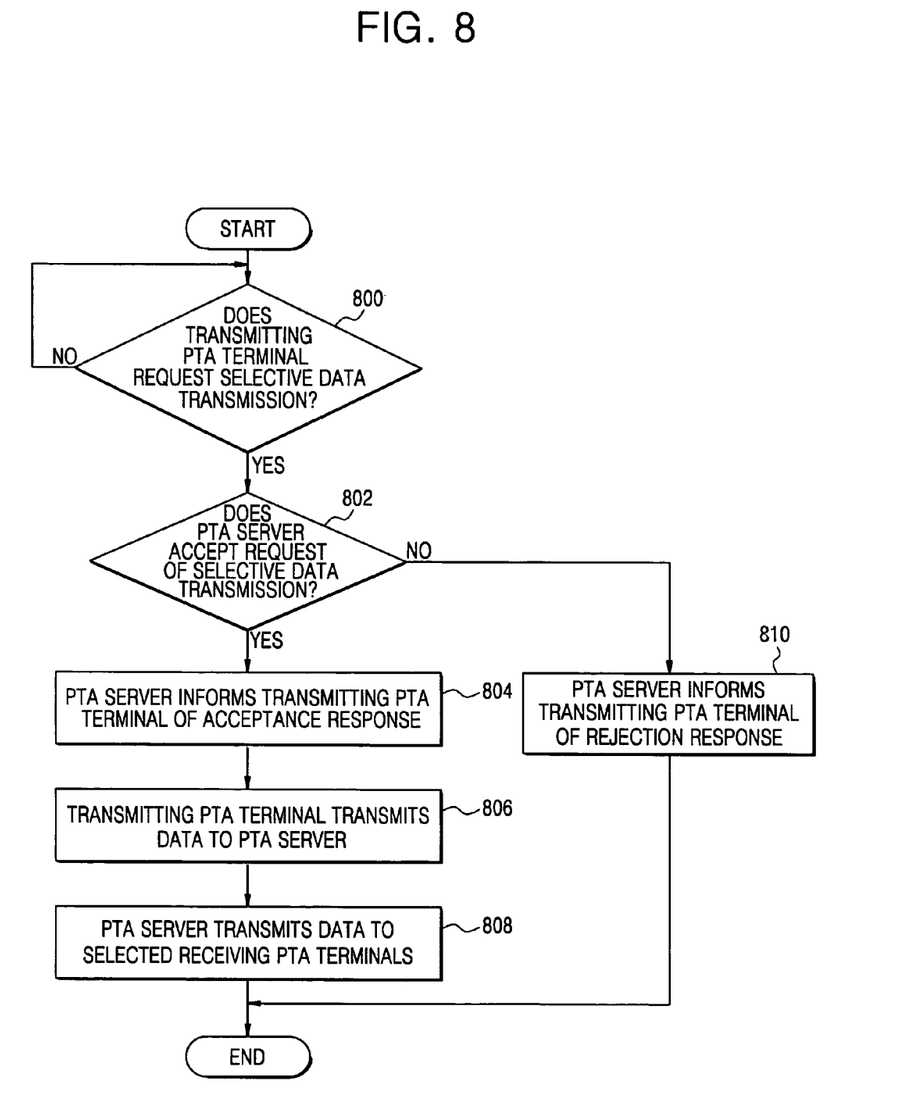
FIG. 8 is a flowchart of processes of a PTA service method for selective data transmission according to an exemplary embodiment of the present invention.

FIG. 8 is a flowchart of processes of a PTA service method for selective data transmission according to an exemplary embodiment of the present invention.

The transmitting PTA terminal transmits a request for a selective data transmission to the PTA server (S800). The request for a selective data transmission is used when the transmitting PTA terminal intends to transmit data to be transmitted later to only some receiving PTA terminals which are designated from among all the receiving PTA terminals participating in a session by the transmitting PTA terminal. In other words, the transmitting PTA terminal can exclude or include specified PTA terminals of the PTA terminals participating in the session as data transmission targets by the request for a selective data transmission. To transmit data to only the specified PTA terminals, the transmitting PTA terminal includes a T flag and CNAME information of the receiving PTA terminals to be designated in the request for selective data transmission, and then transmits the request for a selective data transmission to the PTA server. To transmit data to only the rest of the receiving PTA terminals except the specified receiving PTA terminals, the transmitting PTA terminal includes an F flag and CNAME information of the receiving PTA terminals to be excluded in the request for a selective data transmission, and then transmits the request for a selective data transmission to the PTA server. The request for a selective data transmission is transmitted to the PTA server by a TBCP_REQUEST message. The information of the designated receiving PTA terminals which is contained in the TBCP_REQUEST message is stored in the PTA server.

The PTA server determines whether to accept or reject the request for selective data transmission by the transmitting PTA terminal (S802).

When it has determined that it will accept the request of the transmitting PTA terminal, the PTA server informs the transmitting PTA terminal that the request of the transmitting PTA terminal has been accepted (S804). To this end, a TBCP_GRANT message is used.

When an acceptance response has been received from the PTA server, the transmitting PTA terminal transmits the data to be transmitted to the selected receiving PTA terminals (S806). The PTA server transmits the data received from the transmitting PTA terminal to the receiving PTA terminals designated by the transmitting PTA terminal (S808).

In contrast, when it has determined that it will reject the request of the transmitting PTA terminal, the PTA server informs the transmitting PTA terminal that the request of the transmitting PTA terminal has been rejected (S810). The transmitting PTA terminal receiving a rejection response cannot perform a selective data transmission. In other words, data transmitted by the transmitting PTA terminal receiving the rejection response is transmitted to all of the receiving PTA terminals participating in the session. Alternatively, the PTA server can transmit the TBCP_GRANT message to the transmitting PTA terminal only when accepting the request of the transmitting PTA terminal and, when rejecting the request of the transmitting PTA terminal, the PTA server transmits no message, thereby indicating that the corresponding request is rejected.

Furthermore, when a selective data transmission is requested by the transmitting PTA terminal, the PTA server informs the receiving PTA terminals designated by the transmitting PTA terminal that they are designated as targets of the selective data transmission.

The transmitting PTA terminal, which is provided with the selective data transmission service by these processes, transmits a TBCP_RELEASE message to the PTA server requesting termination of the selective data transmission service. Furthermore, the selective data transmission can be terminated when the PTA terminal requesting selective data transmission loses the floor.

As described above, the present invention allows the transmitting PTA terminal to designate certain receiving PTA terminals to receive data which the transmitting PTA terminal will transmit, so that it can perform a selective data transmission. Thus, the PTA service system provides an additional service and added convenience to TA service users.

Although exemplary embodiments of the present invention have been described, it will be understood by those skilled in the art that the present invention is not limited to the described exemplary embodiments. Rather, various changes and modifications can be made within the spirit and scope of the present invention, as defined by the following claims.

What is claimed is:

1. A Push-To-All (PTA) service system facilitating a selective data transmission, the PTA service system comprising:
   a transmitting PTA terminal adapted to request transmission of data to certain receiving PTA terminals designated by the transmitting PTA terminal among all receiving PTA terminals participating in a session in which the transmitting PTA terminal participates; and
   a PTA server adapted to transmit data received from the transmitting PTA terminal to the designated receiving PTA terminals in response to the request of the transmitting PTA terminal.

2. The PTA service system according to claim 1, wherein the transmitting PTA terminal is adapted to transmit a receiver-designated Talk Burst Control Protocol (TBCP) message containing information as to the designated receiving PTA terminals to the PTA server before data is transmitted, in order to transmit data to the designated receiving PTA terminals.

3. The PTA service system according to claim 2, wherein the receiver-designated TBCP message comprises information as to the designated receiving PTA terminals, and information indicating whether the designated receiving PTA terminals are included or excluded from the PTA terminals to receive the data.

4. The PTA service system according to claim 3, wherein the TBCP message comprises Uniform Resource Identifier (URI) information of the designated receiving PTA terminals, and either T flags or F flags corresponding to each of the designated receiving PTA terminals.

5. The PTA service system according to claim 2, wherein the transmitting PTA terminal is adapted to transmit data that is to be transmitted to the designated receiving PTA terminals after receiving an acceptance response to the receiver-designated TBCP message from the PTA server.

6. The PTA service system according to claim 2, wherein the PTA server is adapted to transmit data received from the transmitting PTA terminal to be transmitted to the designated receiving PTA terminals to the receiving PTA terminals designated by the receiver-designated TBCP message.

7. The PTA service system according to claim 2, wherein the PTA server is adapted to determine whether or not the transmitting PTA terminal is capable of designating a data transmission target, and to transmit an acceptance response to the request to the transmitting PTA terminal upon a determination that the transmitting PTA terminal is capable of designating a data transmission target.

8. The PTA service system according to claim 2, wherein the transmitting PTA terminal is adapted to request termination of a selective data transmission by transmitting a TBCP_RELEASE message to the PTA server.

9. The PTA service system according to claim 2, wherein the PTA server is adapted to terminate a selective data transmission by the transmitting PTA terminal when the transmitting PTA terminal loses the floor.

10. The PTA service system according to claim 1, wherein the PTA server is adapted to inform the receiving PTA terminals designated by the transmitting PTA terminal that the designated receiving PTA terminals have been designated as targets of a selective data transmission, using a TBCP_TAKEN message.

11. The PTA service system according to claim 1, wherein the transmitting PTA terminal comprises a PTA terminal currently having the floor.

12. The PTA service system according to claim 1, wherein the data comprises at least one of Push-To-Talk (PTT) data, Push-To-Video (PTV) data, and Message Session Relay Protocol (MSRP) data.

13. A Push-To-All (PTA) service method facilitating a selective data transmission, the PTA service method comprising:
   a transmitting PTA terminal designating some receiving PTA terminals participating in a session in which the transmitting PTA terminal participates as targets of a subsequent data transmission by the transmitting PTA terminal, for the purpose of a selective data transmission;
   the transmitting PTA terminal transmitting data to be transmitted to the designated receiving PTA terminals participating in the session in which the transmitting PTA terminal participates;
   a PTA server receiving the data from the transmitting PTA terminal; and
   the PTA server transmitting the data to the designated receiving PTA terminals.

14. The PTA service method according to claim 13, wherein designating some receiving PTA terminals comprises the transmitting PTA terminal transmitting a receiver-designated Talk Burst Control Protocol (TBCP) message containing information as to the designated receiving PTA terminals to the PTA server.

15. The PTA service method according to claim 14, wherein designating some receiving PTA terminals further comprises the transmitting PTA terminal receiving an acceptance response to the receiver-designated TBCP message from the PTA server.

16. The PTA service method according to claim 14, further comprising the PTA server storing information of the receiving PTA terminals which is contained in the receiver-designated TBCP message.

17. The PTA service method according to claim 13, further comprising the transmitting PTA terminal requesting termination of a selective data transmission.

18. The PTA service method according to claim 17, wherein requesting termination of selective data transmission comprises the transmitting PTA terminal transmitting a TBCP_RELEASE message containing identification information of the designated receiving PTA terminals to the PTA server.

19. The PTA service method according to claim 13, further comprising the PTA server terminating selective data transmission by the transmitting PTA terminal upon the transmitting PTA terminal losing the floor.

20. The PTA service method according to claim 13, further comprising the PTA server informing the receiving PTA terminals designated by the transmitting PTA terminal that the designated receiving PTA terminals have been designated as targets of a selective data transmission.

\* \* \* \* \*